United States Patent
Phillips et al.

(10) Patent No.: US 6,321,143 B1
(45) Date of Patent: Nov. 20, 2001

(54) CONTROL SYSTEM AND METHOD FOR A HYBRID ELECTRIC VEHICLE

(75) Inventors: Anthony Mark Phillips, Northville; John Richard Blankenship; Kathleen Ellen Bailey, both of Dearborn; Miroslava Jankovic, Birmingham, all of MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/603,165

(22) Filed: Jun. 26, 2000

(51) Int. Cl.[7] .................................................. B60L 11/02
(52) U.S. Cl. ........................ 701/22; 180/65.2; 180/165; 477/2
(58) Field of Search ....................... 701/22, 54; 180/65.2, 180/165; 475/5; 477/2; 318/139

(56) References Cited

U.S. PATENT DOCUMENTS

| | | | |
|---|---|---|---|
| 5,856,709 | * | 1/1999 | Ibaraki et al. ......................... 290/45 |
| 6,196,344 | * | 3/2001 | Tamor ................................. 180/65.4 |
| 6,242,873 | * | 6/2001 | Drozdz et al. ........................ 318/139 |
| 6,249,723 | * | 6/2001 | Lutz ...................................... 701/22 |

* cited by examiner

Primary Examiner—William A. Cuchlinski, Jr.
Assistant Examiner—Arthur D. Donnelly
(74) Attorney, Agent, or Firm—Karl Vick

(57) ABSTRACT

A vehicle system controller (20) is presented for a LSR parallel hybrid electric vehicle having an engine (10), a motor (12), wheels (14), a transmission (16) and a battery (18). The vehicle system controller (20) has a state machine having a plurality of predefined states (22–32) that represent operating modes for the vehicle. A set of rules is defined for controlling the transition between any two states in the state machine. The states (22–32) are prioritized according to driver demands, energy management concerns and system fault occurrences. The vehicle system controller (20) controls the transitions from a lower priority state to a higher priority state based on the set of rules. In addition, the vehicle system controller (20) will control a transition to a lower state from a higher state when the conditions no longer warrant staying in the current state. A unique set of output commands is defined for each state for the purpose of controlling lower level subsystem controllers. These commands serve to achieve the desire vehicle functionality within each state and insure smooth transitions between states.

44 Claims, 2 Drawing Sheets

CONTROL SYSTEM AND METHOD FOR A HYBRID ELECTRIC VEHICLE

This invention was made with Government support under Prime Contract No. DE-AC36-83CH10093 awarded by the Department of Energy. The Government has certain rights in the invention.

TECHNICAL FIELD

The present invention relates generally to a control system and method for a hybrid electric vehicle and more particularly to a system and method for controlling the switching between operating modes in a hybrid electric vehicle.

BACKGROUND OF THE INVENTION

A hybrid electric vehicle has a propulsion system that consists of at least one electric motor that is utilized in some form with another power source. Most often the other power source is a gasoline or diesel engine.

Typically, the two power sources are configured in one of two ways, series and parallel. In a series hybrid the traction force to the vehicle's wheels is provided strictly by the electric motor. Electric energy is stored in a battery and is used to power the motor whenever demanded by the driver. The other power source, i.e. an engine, is used to maintain the level of energy stored in the battery at a level that is adequate to supply power to the electric motor as needed. In a series hybrid the engine is not used to provide direct motive force to the wheels based on driver demand. All of the energy from the engine is stored in the battery, where it is used by the electric motor to propel the vehicle.

In a parallel hybrid, both the engine and the motor can be directly coupled to the vehicle's wheels, so that both power sources can, independently, provide motive force for the vehicle. It should be noted that in a parallel hybrid, the engine is sometimes used to recharge the battery that supplies the motor, just as in a series hybrid.

In a specific configuration of a parallel hybrid, the motor only provides positive torque when it is used to boost the torque from the engine. This configuration requires far less energy from the battery and is often referred to as a Low Storage Requirement (LSR) architecture.

In the past, a vehicle system control algorithm has not existed for a hybrid electric vehicle. The system control algorithm is an important element used to coordinate the control of the power train components thereby managing energy in the vehicle and avoiding driveline disturbances.

SUMMARY OF THE INVENTION

It is an object of the present invention to implement fundamental functions of a parallel hybrid electric vehicle. It is another object of the present invention to provide a vehicle system control algorithm for implementing the functions of a parallel hybrid electric vehicle.

It is a further object of the present invention to provide a logical state machine and a set of rules for transitions between operating modes of a parallel hybrid electric vehicle. It is still a further object of the present invention to provide a set of output commands to the vehicle's subsystem controllers in order to achieve desired vehicle functionality within the states and to insure smooth transitions between operating modes.

In carrying out the above objects and other objects and features of the present invention, a vehicle system control algorithm (VSC) is provided to implement the fundamental functions for a LSR hybrid electric vehicle. Three of the most fundamental functions are the transfer of the power generated in the motor and the engine to the vehicle's wheels based on driver demand, the efficient management of the energy in the battery and the fuel in the vehicle, and the management of system faults.

The VSC of the present invention has two primary components, a logical state machine and a set of output commands. The logical state machine describes a state for each one of six predefined operating modes of the vehicle as well as a set of rules for transitions between operating modes. The set of output commands is provided to the vehicle's subsystem controllers (i.e. the engine, transmission, etc.) for each state in the logical state machine.

The transitions between states are uniquely defined within the state machine. The state machine will execute an allowed transition between states when the required transition conditions are satisfied. The states are prioritized based on driver demand, energy management and system faults.

Where there has been an absence of a vehicle level system controller for LSR hybrid electric vehicles, the present invention advantageously provides dynamic command outputs from a vehicle system controller that handles all of the operations within and switching between predefined operating modes for a LSR hybrid electric vehicle.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAIL DESCRIPTION OF THE PREFERRED EMBODIMENTS

Figure 1:
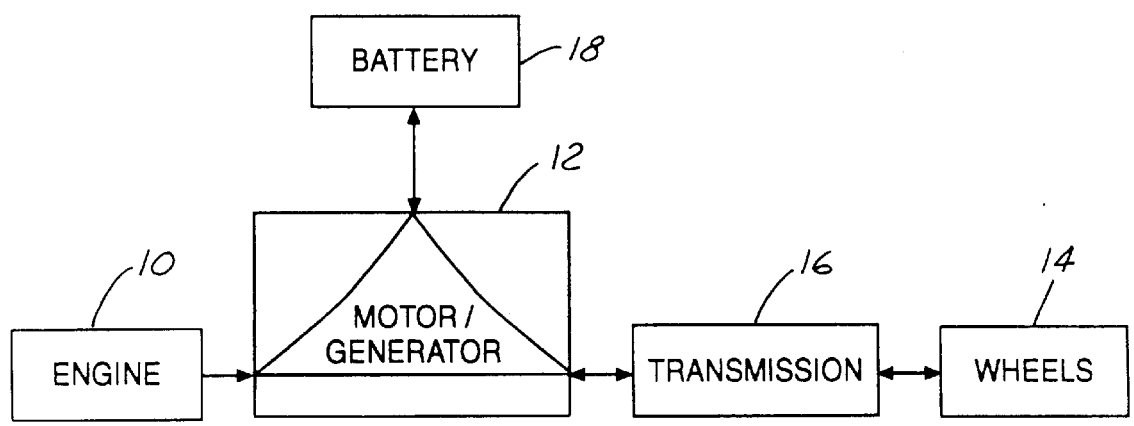
FIG. 1 is a diagram of the energy flow in a low storage requirement, parallel architecture, hybrid electric vehicle.

The present invention provides a vehicle system control algorithm for a low storage requirement (LSR) hybrid electric vehicle having a parallel configuration. FIG. 1 is a diagram of a typical energy flow through a parallel LSR hybrid electric vehicle. In a parallel hybrid vehicle, both the engine and the motor can be directly coupled to the vehicle's wheels so that both power sources can independently provide motive force for the vehicle.

The block diagram in FIG. 1 shows an engine 10 and a motor 12 attached to the vehicle wheels 14 through a transmission 16. A battery 18 is used to supply the motor 12. In a parallel hybrid electric vehicle it is possible to use the engine 10 to recharge the battery 18. It should be noted that the configuration shown in FIG. 1 is only one of many parallel configurations and is shown for example purposes only. It is possible that clutches (not shown) may be located in various locations in the drivetrain to allow temporary disconnection of one or another of the power sources from the other, or from the wheels.

In the example shown in FIG. 1, the transmission 16 is located between the motor 12 and the wheels 14. It should be noted that in other parallel configurations, the positions of the motor and transmission may be reversed. In addition, in still other parallel configurations, the positions of the motor and engine may be reversed. In addition, in still other parallel configurations, the positions of the motor and engine may be reversed. The example shown in FIG. 1 is meant only to show a typical parallel hybrid configuration that is formally defined by the ability of both power sources to provide motive force to the wheels directly. The invention described applies to any parallel hybrid vehicle embodied by any of these configurations, which are consistent with the LSR type defined above.

Figure 2:
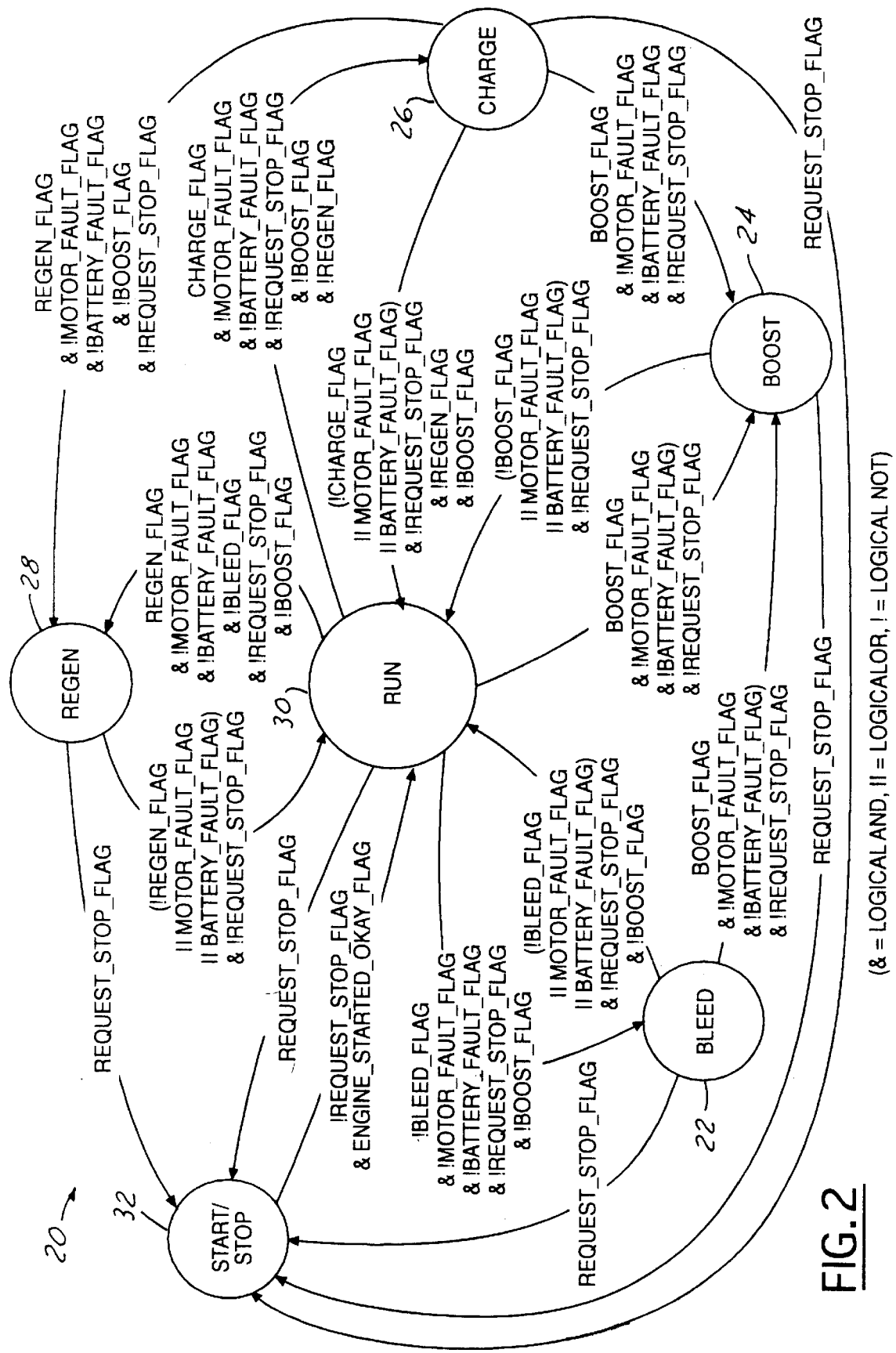
FIG. 2 is a flow chart of the vehicle system control algorithm of the present invention.

Referring now to FIG. 2 there is shown a flow diagram of the vehicle system control algorithm 20 of the present invention. There are three fundamental functions that need to be implemented at a vehicle level in order to operate a low storage requirement hybrid electric vehicle. In particular, the power generated in the motor and the engine must be transferred to the wheels. The energy in the battery and the fuel in the engine must be efficiently managed. And finally, any faults in the system must be managed. The vehicle system control algorithm, or VSC, 20 of the present invention implements these functions by defining a state for each predefined operating mode of the vehicle and a set of rules used for transitions between states as part of a logical state machine. In addition, the VSC supplies a set of output commands to subsystem controllers (not shown) for each state defined in the state machine.

According to the present invention, there are six states representative of different operating modes for the vehicle. The BLEED state 22, the BOOST state 24, the CHARGE state 26, the REGEN state 28, the RUN state 30 and the START/STOP state 32. In the BLEED state 22, the electric motor is used to provide torque to a driveline in order to dissipate energy from the battery for energy management reasons. For example, it may be necessary to enter the BLEED state 22 if the state of the battery charge is too high. The engine output torque command is reduced by the amount necessary to offset the torque provided by the motor so that the operation is transparent to the driver.

The BOOST state 24 occurs when the electric motor is used to provide supplemental torque to the driveline in an attempt to meet the driver's demand should the demanded torque be greater than the engine alone is capable of providing. The CHARGE state 26 is when the electric motor is used as a generator to provide energy to the battery. In this state, the engine drives the motor. The engine output torque is increased over the driver-demanded amount by an amount necessary to drive the motor to charge the battery and make the operation seamless to the driver.

The REGEN state 28 is when the electric motor is used as a generator to provide energy to the battery. The wheels drive the motor during coasting or deceleration of the vehicle.

The RUN state 30 is the default mode of the present invention. In the RUN state 30, the torque is commanded from the engine in order to meet driver demand. Finally, the START/STOP state 32 is when the engine is started or stopped based on driver demand, energy management considerations or fault management.

Transitions between states are allowed when any particular exit condition of the current state is satisfied. In order to uniquely define the transitions within the state machine, the possible next operating modes are prioritized within each state from highest priority to lowest. For instance, from the RUN state, the possible transitions are prioritized as follows: START/STOP, BOOST, BLEED, REGEN, CHARGE, and RUN. Note that the CHARGE and BLEED states do not require relative prioritization as they can never occur simultaneously. (BLEED is only operational at high levels of the battery's state of charge and CHARGE is operational for low levels of the state of charge.) The state machine will execute an allowed transition to any higher priority state as soon as the required transition conditions for the new state are satisfied. The prioritization of the states is based on driver demand, energy management, and system faults. Highest priority transitions typically are associated with system faults. Only when the system performance is on the verge of being compromised, i.e. low-battery state of charge, will energy management functions take precedence over driver demand.

According to the present invention, flags for the transition conditions represent logical relationships between the vehicle operating status (e.g. battery state of charge, vehicle speed, gear, etc.), driver demand (e.g. brake and accelerator pedal position), and system faults. The following flags are shown in FIG. 3; REQUEST_STOP_FLAG, REGEN_FLAG, CHARGE_FLAG, BOOST_FLAG, BLEED_FLAG, ENGINE_STARTED_OKAY_FLAG, MOTOR_FAULT_FLAG, and BATTERY_FAULT_FLAG. The definitions of the flags can be very complicated. For example, the REQUEST_STOP_FLAG, when true, implies either 1) the vehicle is currently in a state in which the engine can be turned off, the driver is not demanding any power to the wheels, and there are no subsystem faults that would prevent the motor from starting the engine, or 2) the engine has stalled, or 3) the driver has turned off the key. For purposes of this disclosure, the transition flags will not be defined in detail, but rather the emphasis will be placed on the states themselves and the transitions therebetween. One skilled in the art is capable of defining the flags necessary for the transitions between operating modes.

The transition between states is allowed when a particular exit condition of the current state is satisfied. For example, if the VSC is in the REGEN state, a transition to START/STOP will occur when the transition condition REQUEST_STOP_FLAG is true. This transition is from a state of lower priority to a state of higher priority.

Conversely, in the event the vehicle operating conditions change such that the conditions no longer warrant staying in the current state, the state machine will exit the current state along an allowable transition to the highest priority state for which the transition conditions are satisfied. For example, if the controller is in the BOOST state and a driver removes his foot from the accelerator pedal, the BOOST_FLAG becomes false. The state machine will then transition to the RUN state assuming the REQUEST_STOP_FLAG is false.

As mentioned above, the prioritization of the state is based on driver demand, energy management and system faults. Highest priority transitions typically are associated with system faults. For instance, a motor fault will cause a transition out of any of the states that depend on motor operation (e.g. BOOST). Driver demand dictates the next level of priority. In general, satisfying the driver's desire to deliver torque to the wheels takes preference over energy management. As an example of this, BOOST is considered a higher priority state than BLEED or CHARGE because it exists to satisfy increased driver demand, whereas the other two serve energy management functions. Only when the system performance is on the verge of being compromised (e.g. low battery state of charge), do energy management functions take precedence over driver demand.

Table 1 is presented herein to indicate the predefined operating states and the transitions allowed therebetween. The column on the left is the current state of operation. The row on the top of the table is the state to be transitioned into. The marked boxes indicate transitions between states that are allowed.

TABLE 1

| From/To: | Start/Stop | Boost | Bleed | Regen | Charge | Run |
|---|---|---|---|---|---|---|
| Start/Stop |  |  |  |  |  | X |
| Boost | X |  |  |  |  | X |
| Bleed | X | X |  |  |  | X |
| Regen | X |  |  |  |  | X |
| Charge | X | X |  | X |  | X |
| Run | X | X | X | X | X |  |

Table 1 and FIG. 2 will be used to describe the rules that apply to the transitions between states. For example, there is only one allowed transition from the START/STOP state and that is to the RUN state. In order for the transition to take place, the REQUEST_STOP_FLAG must be false and the ENGINE_STARTED_OKAY_FLAG must be true.

The transitions allowed from the BOOST state are to the START/STOP state and the RUN state. For a transition from BOOST to START/STOP, all that is required is the REQUEST_STOP_FLAG be true. For a transition from BOOST to RUN, in addition to the REQUEST_STOP_FLAG being false, either the BOOST_FLAG is false, the MOTOR_FAULT_FLAG is true, or the BATTERY_FAULT_FLAG is true.

The BLEED state can transition to the START/STOP state, the BOOST state, and the RUN state. From BLEED to START/STOP, all that is required is that the REQUEST_STOP_FLAG is true. From BLEED to BOOST, the BOOST_FLAG is true, and the MOTOR_FAULT_FLAG, the BATTERY_FAULT_FLAG and the REQUEST_STOP_FLAG are all false. From BLEED to RUN, the BLEED_FLAG must be false, the MOTOR_FAULT_FLAG must be true, or the BATTERY_FAULT_FLAG must be true. Any one of these conditions must apply in conjunction with the REQUEST_STOP_FLAG and the BOOST_FLAG both being false.

The REGEN state can transition to START/STOP and RUN. As in the other situations, a transition from REGEN to START/STOP merely requires the REQUEST_STOP_FLAG be true. The transition from REGEN to RUN requires the REQUEST_STOP_FLAG be false and either the REGEN_FLAG is false, the MOTOR_FAULT_FLAG is true, or the BATTERY_FAULT_FLAG is true.

Transitions from the CHARGE state include the START/STOP state, the BOOST state, the REGEN state, and the RUN state. The transition from CHARGE to START/STOP requires only the REQUEST_STOP_FLAG be true. The transition from CHARGE to BOOST requires the BOOST_FLAG is true and the MOTOR_FAULT_FLAG, the BATTERY_FAULT_FLAG, and the REQUEST_STOP_FLAG are all false. The transition from CHARGE to REGEN requires the REGEN_FLAG is true, and the MOTOR_FAULT_FLAG, the BATTERY_FAULT_FLAG, the REQUEST_STOP_FLAG and the BOOST_FLAG are all false. Finally, the transition between CHARGE and RUN requires either the CHARGE_FLAG is false, the MOTOR_FAULT_FLAG is true, or the BATTERY_FAULT_FLAG is true, and the REQUEST_STOP_FLAG, the REGEN_FLAG, and the BOOST_FLAG are all false.

As mentioned above, the RUN state is the default state. It is possible to transition from RUN to any one of the other possible states. As usual a transition from RUN to START/STOP requires the REQUEST_STOP_FLAG be true. For a transition from RUN to BOOST, the BOOST_FLAG must be true and the MOTOR_FAULT_FLAG, the BATTERY_FAULT_FLAG, and the REQUEST_STOP_FLAG must all be false. For a transition from RUN to BLEED, the BLEED_FLAG must be true and the MOTOR_FAULT_FLAG, the BATTERY_FAULT_FLAG, the REQUEST_STOP_FLAG, and the BOOST_FLAG must all be false. For a transition from RUN to REGEN, the REGEN_FLAG must be true and the MOTOR_FAULT_FLAG, the BATTERY_FAULT_FLAG, the BLEED_FLAG, the REQUEST_STOP_FLAG and the BOOST_FLAG must all be false. Finally, for a transition from RUN to CHARGE, the CHARGE_FLAG must be true and the MOTOR_FAULT_FLAG, the BATTERY_FAULT_FLAG, the REQUEST_STOP_FLAG, the BOOST_FLAG and the REGEN_FLAG must all be false.

The present invention provides a Vehicle System Control algorithm having a logical state machine for defining the operating modes of the vehicle as well as a set of rules for transitions between the modes. According to the present invention, a set of output commands is provided to the vehicle subsystem controllers (not shown) for each state within the state machine.

The invention covers all alternatives, modifications, and equivalents, as may be included within the spirit and scope of the appended claims.

What is claimed is:

1. A vehicle system controller for a LSR parallel hybrid electric vehicle having subsystem controllers, said vehicle system controller comprising:

a state machine having a plurality of predefined states representing operating modes of said vehicle;

a set of rules defining logical relationships between each of said plurality of predefined states; and a set of commands unique to each state supplied to said subsystem controllers to achieve desired vehicle functionality within the states and to transition between said plurality of predefined states.

2. The controller as claimed in claim 1 wherein said plurality of predefined states representing operating modes are prioritized according to system fault occurrences, driver demands, and energy management requirements.

3. The controller as claimed in claim 2 wherein said system fault occurrences are defined as a first priority, driver demands are a second priority, and energy demands are a third priority.

4. The controller as claimed in claim 2 wherein said system fault occurrences are defined as a first priority, said energy demands are a second priority in the event system performance is being compromised, and driver demands are a third priority.

5. The controller as claimed in claim 1 wherein said set of rules further comprises at least one of a plurality of transition flags wherein each transition flag of said plurality of transition flags is representative of a logical relationship associated with sensed vehicle operating status, driver demand, or system faults.

6. The controller as claimed in claim 5 wherein said plurality of transition flags further comprises:

a REQUEST_STOP_FLAG;

an ENGINE_STARTED_OKAY_FLAG;

a BLEED_FLAG;

a BOOST_FLAG;

a CHARGE_FLAG;

a REGEN_FLAG;

a MOTOR_FAULT_FLAG;

a BATTERY_FAULT_FLAG; and each of said plurality of transition flags are true and false depending on the current vehicle operating status, driver demand, and system fault status.

7. The controller as claimed in claim 6 wherein said plurality of predefined states representing operating modes are defined as a start/stop state, a boost state, a bleed state, a regen state, a charge state and a run state.

8. The controller as claimed in claim 7 wherein said plurality of predefined states are prioritized from highest priority to lowest priority as start/stop, boost, bleed, regen, charge and run.

9. The controller as claimed in claim 8 wherein said run state is defined as a default state for said state machine.

10. The controller as claimed in claim 9 wherein said set of commands controls a transition to said start/stop state from any one of said plurality of states for said set of rules comprising said REQUEST_STOP_FLAG transition flag is true.

11. The controller as claimed in claim 9 wherein said set of commands controls a transition from said start/stop state to said run state for said set of rules comprising:

said REQUEST_STOP_FLAG transition flag is false AND said ENGINE_STARTED_OKAY_FLAG is true.

12. The controller as claimed in claim 9 wherein said set of commands controls a transition from said bleed state to said run state for said set of rules comprising:

said REQUEST_STOP_FLAG is false;

said BOOST_FLAG is false; and at least one of the following is true; said BLEED_FLAG is false, said MOTOR_FAULT_FLAG is true, or said BATTERY_FAULT_FLAG is true.

13. The controller as claimed in claim 9 wherein said set of commands controls a transition from said run state to said bleed state for said set of rules comprising:

said BLEED_FLAG is true;

said MOTOR_FAULT_FLAG is false;

said BATTERY_FAULT_FLAG is false;

said REQUEST—STOP_FLAG is false; and said BOOST_FLAG is false.

14. The controller as claimed in claim 9 wherein said set of commands controls a transition from said boost state to said run state for said set of rules comprising:

said REQUEST_STOP_FLAG is false; and at least one of the following is true; said BOOST_FLAG is false, said MOTOR_FAULT_FLAG is true, or said BATTERY_FAULT_FLAG is true.

15. The controller as claimed in claim 9 wherein said set of commands controls a transition from said run state to said boost state for said set of rules comprising:

said BOOST_FLAG is true;

said MOTOR_FAULT_FLAG is false;

said BATTERY_FAULT_FLAG is false; and said REQUEST—STOP_FLAG is false.

16. The controller as claimed in claim 9 wherein said set of commands controls a transition from said bleed state to said boost state for said set of rules comprising:

said REQUEST_$_{STOP}$_FLAG is false;

said BOOST_FLAG is true;

said MOTOR_FAULT_FLAG is false; and said BATTERY_FAULT_FLAG is false.

17. The controller as claimed in claim 9 wherein said set of commands controls a transition from said charge state to said boost state for said set of rules comprising:

said REQUEST_STOP_FLAG is false;

said BOOST_FLAG is true;

said MOTOR_FAULT_FLAG is false; and said BATTERY_FAULT_FLAG is false.

18. The controller as claimed in claim 9 wherein said set of commands controls a transition from said run state to said charge state for said set of rules comprising:

said CHARGE_FLAG is true;

said MOTOR_FAULT_FLAG is false;

said BATTERY_FAULT_FLAG is false;

said REQUEST_STOP_FLAG is false;

said BOOST_FLAG is false; and said REGEN_FLAG is false.

19. The controller as claimed in claim 9 wherein said set of commands controls a transition from said charge state to said run state for said set of rules comprising:

said REQUEST_STOP_FLAG is false;

said REGEN_FLAG is false;

said BOOST_FLAG is false; and at least one of the following is true; said CHARGE_FLAG is false, said MOTOR_FAULT_FLAG is true, or said BATTERY_FAULT_FLAG is true.

20. The controller as claimed in claim 9 wherein said set of commands controls a transition from said charge state to said regen state for said set of rules comprising:

said REGEN_FLAG is true;

said REQUEST_STOP_FLAG is false;

said BOOST_FLAG is false;

said MOTOR_FAULT_FLAG is false; and said BATTERY_FAULT_FLAG is false.

21. The controller as claimed in claim 9 wherein said set of commands controls a transition from said regen state to said run state for said set of rules comprising:

said REQUEST_STOP_FLAG is false; and at least one of the following is true; said REGEN_FLAG is false, said MOTOR_FAULT_FLAG is true, or said BATTERY_FAULT_FLAG is true.

22. The controller as claimed in claim 9 wherein said set of commands controls a transition from said run state to said regen state for said set of rules comprising:

said REGEN_FLAG is true;

said REQUEST_STOP_FLAG is false;

said BLEED_FLAG is false;

said BOOST_FLAG is false;

said MOTOR_FAULT_FLAG is false; and said BATTERY_FAULT_FLAG is false.

23. A method for controlling a LSR parallel hybrid electric vehicle having subsystem controllers, said method comprising the steps of: defining a plurality of states in a state machine wherein each of said plurality of states represents an operating mode for said vehicle;

defining a set of rules representing logical relationships between each of said plurality of states; and supplying a set of commands unique to each state to said subsystem controllers to achieve desired vehicle functionality within the states and to transition between said plurality of states.

24. The method as claimed in claim 23 further comprising the step of prioritizing said plurality of states based on driver demands, system fault occurrences and energy management requirements.

25. The method as claimed in claim 24 wherein said step of prioritizing said plurality of states further comprises the steps of:
defining said system fault occurrences as a first level of priority;
defining said driver demands as a second level of priority; and
defining said energy management occurrences as a third level of priority.

26. The method as claimed in claim 24 wherein said step of prioritizing said plurality of states further comprises the steps of:
defining said system fault occurrences as a first level of priority;
defining said energy management occurrences as a second level of priority in the event vehicle performance is being compromised; and
defining said driver demands as a third level of priority.

27. The method as claimed in claim 23 wherein said step of defining a set of rules further comprises the step of defining a plurality of transition flags, each of said transition flags being representative of a logical relationship associated with sensed vehicle operating status, driver demand, or system faults.

28. The method as claimed in claim 27 wherein said step of defining a plurality of transition flags further comprises defining a REQUEST_STOP_FLAG, an ENGINE_STARTED_OKAY_FLAG, a BLEED_FLAG, a BOOST_FLAG, a CHARGE_FLAG, a REGEN_FLAG, a MOTOR_FAULT_FLAG, and a BATTERY_FAULT_FLAG, wherein each of said flags are true and false depending on the current vehicle operating status, driver demand, and system fault status.

29. The method as claimed in claim 28 wherein said step of defining a plurality of states further comprises defining a start/stop state, a boost state, a bleed state, a regen state, a charge state and a run state.

30. The method as claimed in claim 29 further comprising the step of prioritizing said states from highest priority to lowest priority as start/stop, boost, bleed, regen, charge and run.

31. The method as claimed in claim 29 further comprising the step of defining the run state to be a default state.

32. The method as claimed in claim 31 wherein said step of supplying a set of commands further comprises supplying a set of commands for a transition to said start/stop state from any one of said plurality of states for said REQUEST_STOP_FLAG transition flag being true.

33. The method as claimed in claim 31 wherein said step of supplying a set of commands further comprises supplying a set of commands for a transition from said start/stop state to said run state for said set of rules comprising:
said REQUEST_STOP_FLAG transition flag is false AND said ENGINE_STARTED_OKAY_FLAG is true.

34. The method as claimed in claim 31 wherein said step of supplying a set of commands further comprises supplying a set of commands for a transition from said bleed state to said run state for said set of rules comprising:
said REQUEST_STOP_FLAG is false;
said BOOST_FLAG is false; and
at least one of the following is true; said BLEED_FLAG is false, said MOTOR_FAULT_FLAG is true, or said BATTERY_FAULT_FLAG is true.

35. The method as claimed in claim 31 wherein said step of supplying a set of commands further comprises supplying a set of commands for a transition from said run state to said bleed state for said set of rules comprising:
said BLEED_FLAG is true;
said MOTOR_FAULT_FLAG is false;
said BATTERY_FAULT_FLAG is false;
said REQUEST-STOP_FLAG is false; and
said BOOST_FLAG is false.

36. The method as claimed in claim 31 wherein said step of supplying a set of commands further comprises supplying a set of commands for a transition from said boost state to said run state for said set of rules comprising:
said REQUEST_STOP_FLAG is false; and
at least one of the following is true; said BOOST_FLAG is false, said MOTOR_FAULT_FLAG is true, or said BATTERY_FAULT_FLAG is true.

37. The method as claimed in claim 31 wherein said step of supplying a set of commands further comprises supplying a set of commands for a transition from said run state to said boost state for said set of rules comprising:
said BOOST_FLAG is true;
said MOTOR_FAULT_FLAG is false;
said BATTERY_FAULT_FLAG is false; and
said REQUEST_STOP_FLAG is false.

38. The method as claimed in claim 31 wherein said step of supplying a set of commands further comprises supplying a set of commands for a transition from said bleed state to said boost state for said set of rules comprising:
said REQUEST_STOP_FLAG is false;
said BOOST_FLAG is true;
said MOTOR_FAULT_FLAG is false; and
said BATTERY_FAULT_FLAG is false.

39. The method as claimed in claim 31 wherein said step of supplying a set of commands further comprises supplying a set of commands for a transition from said charge state to said boost state for said set of rules comprising:
said REQUEST_STOP_FLAG is false;
said BOOST_FLAG is true;
said MOTOR_FAULT_FLAG is false; and
said BATTERY_FAULT_FLAG is false.

40. The method as claimed in claim 31 wherein said step of supplying a set of commands further comprises supplying a set of commands for a transition from said run state to said charge state for said set of rules comprising:
said CHARGE_FLAG is true;
said MOTOR_FAULT_FLAG is false;
said BATTERY_FAULT_FLAG is false;
said REQUEST_STOP_FLAG is false;
said BOOST_FLAG is false; and
said REGEN_FLAG is false.

41. The method as claimed in claim 31 wherein said step of supplying a set of commands further comprises supplying a set of commands for a transition from said charge state to said run state for said set of rules comprising:

said REQUEST_STOP_FLAG is false;

said REGEN_FLAG is false;

said BOOST_FLAG is false; and at least one of the following is true; said CHARGE_FLAG is false, said MOTOR_FAULT_FLAG is true, or said BATTERY_FAULT_FLAG is true.

42. The method as claimed in claim 31 wherein said step of supplying a set of commands further comprises supplying a set of commands for a transition from said charge state to said regen state for said set of rules comprising:

said REGEN_FLAG is true;

said REQUEST_STOP_FLAG is false;

said BOOST_FLAG is false;

said MOTOR_FAULT_FLAG is false; and said BATTERY_FAULT_FLAG is false.

43. The method as claimed in claim 31 wherein said step of supplying a set of commands further comprises supplying a set of commands for a transition from said regen state to said run state for said set of rules comprising:

said REQUEST_STOP_FLAG is false; and at least one of the following is true; said REGEN_FLAG is false, said MOTOR_FAULT_FLAG is true, or said BATTERY_FAULT_FLAG is true.

44. The method as claimed in claim 31 wherein said step of supplying a set of commands further comprises supplying a set of commands for a transition from said run state to said regen state for said set of rules comprising:

said REGEN_FLAG is true;

said REQUEST_STOP_FLAG is false;

said BLEED_FLAG is false;

said BOOST_FLAG is false;

said MOTOR_FAULT_FLAG is false; and said BATTERY_FAULT_FLAG is false.

* * * * *